United States Patent [19]

Schramm et al.

[11] Patent Number: 5,313,390
[45] Date of Patent: May 17, 1994

[54] METHOD AND APPARATUS FOR CONTROL AND REGULATION OF A VEHICLE CHASSIS HAVING AN ADJUSTABLE DAMPER

[75] Inventors: Wolfgang Schramm, Leonberg; René Schenk, Tamm-Hohensstange, both of Fed. Rep. of Germany

[73] Assignee: Robert Bosch GmbH, Stuttgart, Fed. Rep. of Germany

[21] Appl. No.: 689,821

[22] PCT Filed: Sep. 27, 1990

[86] PCT No.: PCT/DE90/00732

§ 371 Date: May 29, 1991

§ 102(e) Date: May 29, 1991

[87] PCT Pub. No.: WO91/06439

PCT Pub. Date: May 16, 1991

[30] Foreign Application Priority Data

Oct. 24, 1989 [DE] Fed. Rep. of Germany ....... 3935376

[51] Int. Cl.⁵ ................. B60G 11/26; B60G 17/00
[52] U.S. Cl. ................. 364/424.05; 364/424.1; 280/707
[58] Field of Search ........ 364/431.05, 424.1; 280/707, 840; 188/378, 299

[56] References Cited

U.S. PATENT DOCUMENTS

| | | | |
|---|---|---|---|
| 4,700,971 | 10/1987 | Doi et al. | 364/424.05 |
| 4,887,699 | 12/1989 | Ivers et al. | 188/378 |
| 4,936,423 | 6/1990 | Karnopp | 188/299 |
| 4,993,523 | 2/1991 | Schwemmer et al. | 188/299 |
| 5,020,781 | 6/1991 | Huang | 280/707 |
| 5,060,157 | 10/1991 | Tado et al. | 280/707 |
| 5,060,919 | 10/1991 | Takano et al. | 280/707 |
| 5,089,966 | 2/1992 | Fukushima et al. | 364/424.05 |
| 5,090,728 | 2/1992 | Yokoya et al. | 280/707 |
| 5,138,554 | 8/1992 | Wada | 364/424.05 |

FOREIGN PATENT DOCUMENTS 0215999 4/1987 European Pat. Off. .

OTHER PUBLICATIONS

Japanese Patent No. 58-211044, Patent Abstracts of Japan, vol. 8, No. 57.

*Primary Examiner*—Thomas G. Black
*Assistant Examiner*—Tan Q. Nguyen
*Attorney, Agent, or Firm*—Baker & Daniels

[57] ABSTRACT

The invention relates to a process and a device for suspension control on vehicles, in which the reference damping force (reference value) for at least one adjustable damper with flow-resistance-damped piston is calculated from at least one status variable and is used for actuating the damper. It is proposed for the use of a damper of simple design that the actual value of the piston speed ($\dot{x}_{ar}$) of the damper is fed to the damper by means of a family of characteristic curves, taking into account the calculated reference damping force ($F_{d\,ref}$), for the purpose of setting its adjustable through-flow cross-section (q).

13 Claims, 2 Drawing Sheets

METHOD AND APPARATUS FOR CONTROL AND REGULATION OF A VEHICLE CHASSIS HAVING AN ADJUSTABLE DAMPER

BACKGROUND OF THE INVENTION

The invention relates to a process for suspension control on vehicles, in which the reference damping force (reference value) for at least one adjustable damper with flow-resistance-damped piston is calculated from at least one status variable and used for actuating the damper.

Conventional suspensions have a so-called passive damping system, which means that a damper is connected parallel to the respectively present spring arrangement of a wheel and has, for example, a liquid-damped piston. An expulsion of liquid occurs by means of tensile or compressive forces. In this case, the liquid passes through a through-flow cross-section.

In a so-called semiactive suspension control, dampers are used which have a cylinder which is divided by a piston into two working spaces. A through-flow cross-section which can be controlled from outside is provided for the pressure medium which can be expelled by the piston, so that the damping properties (degrees of damping) can be adjusted. Depending on the vehicle state, the actual damping force is matched to the current conditions by means of a control system by rapidly adjusting the through-flow cross-section. In this way an improvement of the comfort and of the driving safety of a vehicle can be achieved.

It is known to construct a vehicle control according to the Karnopp control concept and to operate it with a semiactive special damper. In the Karnopp control concept, the damping force is adjusted proportionally to an absolute body speed. This so-called absolute body speed is defined between an inertial system (fixed, independent system) and a point on the body of the vehicle. The aforesaid special damper has electrically adjustable pressure control valves by means of which a reference damping force, which is preset by the control circuit, can be fed directly to the damper in order to adjust it. However, special dampers of this kind are very costly.

SUMMARY OF THE INVENTION

In contrast with the above, the process according to the invention having the features specified in the main claim has the advantage that a semiactive damper of simple construction in which there is simply an adjustable through-flow cross-section for the pressure medium which can be expelled by the piston can be used. According to the invention, the actual value of the piston speed of the damper is fed to the damper by means of a family of characteristic curves, taking into account the reference damping force calculated by the control circuit, for the purpose of setting its adjustable through-flow cross-section. Therefore, the family of characteristic curves assumes a matching function in that the output variable calculated in the suspension control system is converted by the family of curves in such a way that a direct actuation of the through-flow cross-section of the damper is possible. The aforementioned, known special damper with electrically adjustable pressure control valves can therefore be dispensed with.

In particular, it is provided that the calculated reference damping force is fed to the family of characteristic curves as an input variable. The reference damping force is preferably calculated according to the Karnopp control concept.

A further development of the invention proposes that the absolute body speed which, as already mentioned above, occurs between the inertial system and the body of the vehicle, be calculated as status variable and the reference damping force be determined from the said absolute vehicle body speed and the relative piston speed (actual value) of the damper acting between the vehicle body and the suspension.

For the calculation of the reference damping force, either a digital or else an analog computing circuit can be used.

According to a particularly preferred embodiment of the invention, the family of characteristic curves carries out a simulation of the damper, an actual damping force being supplied as output variable. This actual damping force is connected, together with the calculated reference damping force, to a controller for the purpose of forming a control differential, the output value of which controller is fed on the one hand to the damper as a measure of the through-flow cross-section to be set and on the other hand to the family of characteristic curves as an input variable. Therefore, the family of characteristic curves receives as input variables the piston speed (actual value) of the damper and the through-flow cross-section, or a voltage corresponding thereto, obtained by calculation. By virtue of the aforesaid controller, the through-flow cross-section of the damper is adjusted by means of the reference value/actual value comparison of the damping force calculated in accordance with the Karnopp control concept and of the damping force supplied by the family of characteristic curves until the reference value and actual value of the damping force coincide.

A voltage/through-flow cross-section converter is preferably connected between the family of characteristic curves and the damper. This converter sets the through-flow cross-section of the damper in accordance with the associated control voltage.

The family of characteristic curves is preferably generated electronically. This can occur by means of digital or analog technology.

The invention also relates to a device for suspension control on vehicles, having a computing circuit which calculates from at least one status variable the reference damping force (reference value) for at least one adjustable damper with flow-resistance-damped piston and feeds this to the damper for the purpose of actuation, the actual value of the piston speed of the damper being fed by means of a family of characteristic curves to the damper, taking into account the calculated reference damping force, for the purpose of setting its adjustable through-flow cross-section.

In particular, a sensor is provided which detects the piston travel of the damper and feeds it via a differentiator and a full-wave rectifier to a squaring element, the output value of which is multiplied by a control voltage corresponding to the through-flow cross-section for the purpose of forming the actual damping force. A circuit design of this kind can be implemented in a simple way in analog technology. The analog circuit also provides for the vehicle body speed to be fed to an inverter which is changed over as a function of the sign of the piston speed and is connected via a half-wave rectifier to a summing point, to which the output value of the full-wave rectifier is fed as a further input variable, the output value of the summing point forming the reference damping force.

Particularly good results can be achieved with a suspension control in which each wheel of the vehicle is assigned an adjustable damper with associated suspension control circuit.

BRIEF DESCRIPTION OF THE DRAWINGS

The invention is explained below in greater detail with reference to the figures, in which.

DETAILED DESCRIPTION OF THE INVENTION

Figure 1:
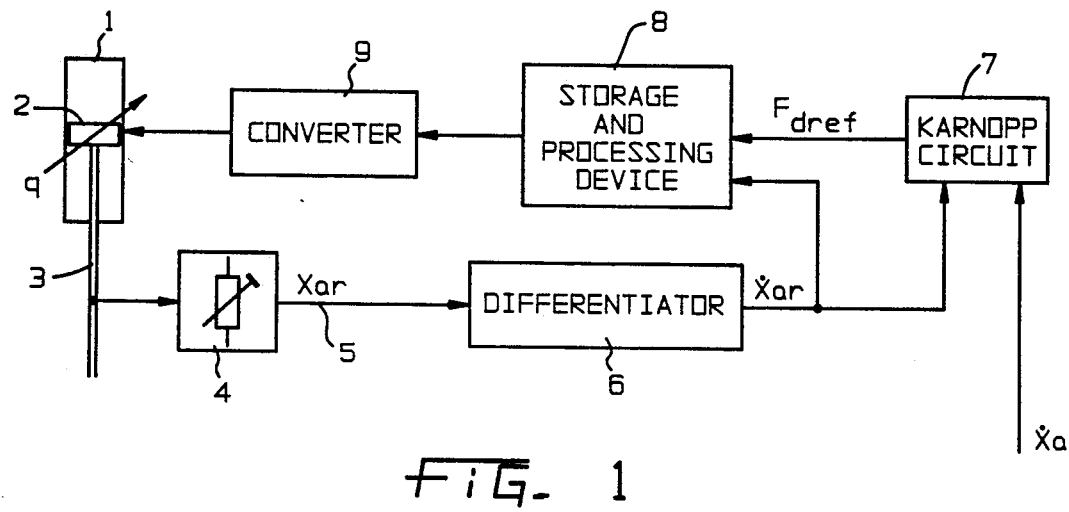
FIG. 1 shows a block circuit diagram of a device for suspension control.

FIG. 1 shows a block circuit diagram of a suspension control with a semiactive damper 1, which has a piston 2 and an adjustable through-flow cross-section q. The adjustability of through-flow cross-section q is indicated by the oblique arrow which crosses the piston 2. The piston 2 is provided with a piston rod 3, which cooperates with a sensor 4. The latter can be constructed, for example, as a potentiometer, so that the respectively set resistance value of the potentiometer corresponds to the piston position in the damper. Therefore, a voltage which corresponds to the relative piston travel $x_{ar}$ is available at the output 5 of the sensor 4. The relative piston travel is to be understood as the compression travel between a wheel bearing part receiving a wheel of the vehicle and the body of the vehicle.

The sensor 4 is connected to a differentiator 6, which forms a relative piston speed $\dot{x}_{ar}$ from the relative piston travel $x_{ar}$. The piston speed $\dot{x}_{ar}$ is fed to a Karnopp circuit 7 and a storage and processing device 8 including mapped data representing a family of characteristic curves, in each case as output variables. The Karnopp circuit 7 receives an absolute vehicle body speed $\dot{x}_a$ as further input variable. This absolute vehicle body speed is to be understood as the speed occurring between an inertial system and the body of the vehicle. The inertial system characterises an independent, stationary coordinate system.

The Karnopp circuit 7 calculates according to the known Karnopp control concept ("Skyhook") a reference damping force $F_{d\,ref}$ from the input variable relative piston speed $\dot{x}_{ar}$ and vehicle body speed $\dot{x}_a$. This is to be understood as a force which is obtained by calculation and, on the basis of the aforesaid Karnopp control concept, would have to be present at the semiactive damper 1.

The reference damping force $F_{d\,ref}$ is fed, in addition to the already mentioned further input variable of the piston speed $\dot{x}_{ar}$, to storage and processing device 8, which calculates from these values the through-flow cross-section q in the case of the vehicle conditions prevailing which would have to be set as control voltage. This control voltage is fed to a voltage/through-flow cross-section converter 9, which sets the through-flow cross-section q in accordance with the size of the control voltage.

Figure 2:
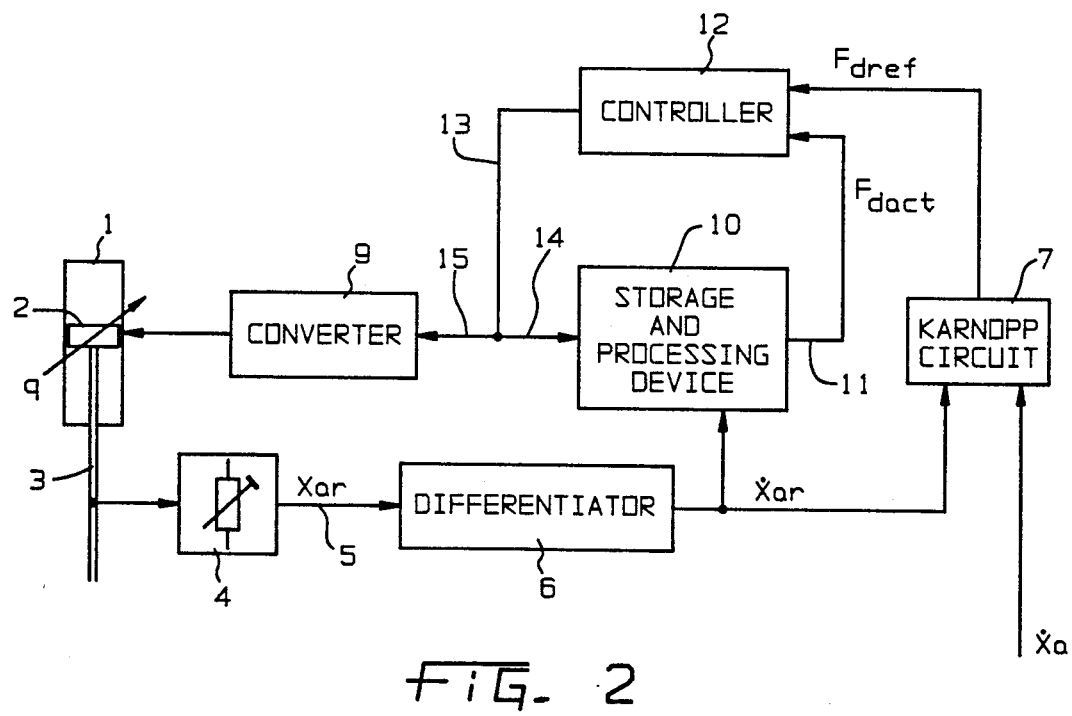
FIG. 2 shows a further exemplary embodiment of a suspension control.

In the exemplary embodiment of FIG. 2, identical parts are provided with identical reference numerals. However, as a departure from the exemplary embodiment of FIG. 1, the piston speed $\dot{x}_{ar}$ is fed to a storage and processing device 10 including mapped data representing a family of characteristic curves which carries out a simulation of the semiactive damper 1. An output 11 of storage and processing device 10 feeds an actual damping force $F_{dact}$, obtained on the basis of the simulation, to a controller 12, which receives the reference damping force $F_{d\,ref}$ as further input variable from the Karnopp circuit 7 in order to form a control differential. At the output 13 of the controller 12, a control voltage corresponding to the through-flow cross-section q of the damper 1 is available, which is fed on the one hand as input variable 14 to storage and processing device 10 and on the other hand as input variable 15 to the voltage/through-flow cross-section converter 9, which carries out the setting of the through-flow cross-section q of the damper 1.

Figure 3:
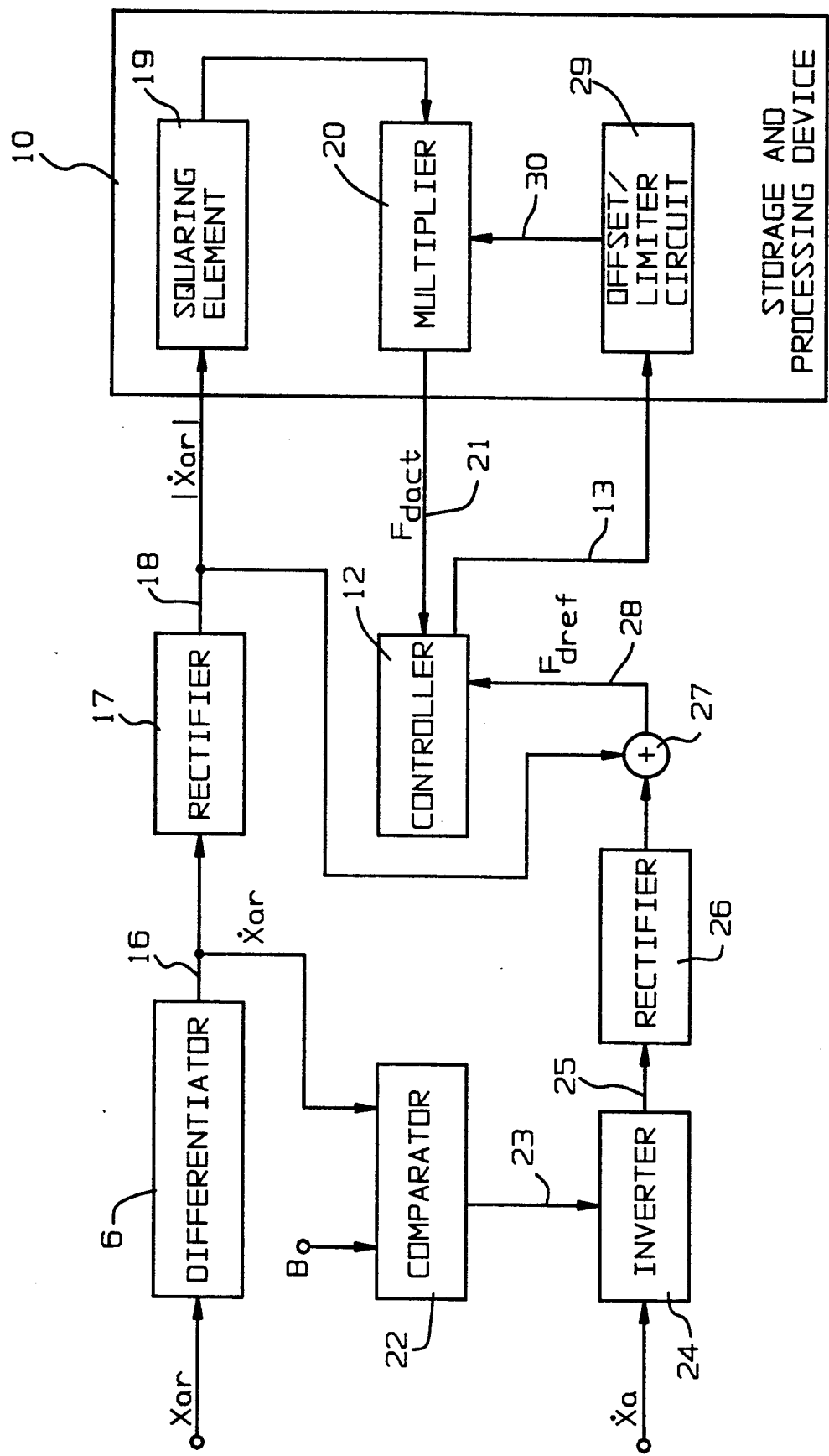
FIG. 3 shows a detailed block circuit diagram of the suspension control according to FIG. 2.

FIG. 3 shows a detailed block circuit diagram of an analog circuit according to the concept of the exemplary embodiment of FIG. 2. The piston travel $x_{ar}$ is fed to the already mentioned differentiator 6, which can also contain a low-pass filter at the same time. The piston speed $\dot{x}_{ar}$ available at the output 16 of the differentiator 6 is supplied to a full-wave rectifier 17, at the output 18 of which the value of the piston speed $\dot{x}_{ar}$ is available. This value is supplied to storage and processing device 10, specifically to the squaring element 19. The output value of the squaring element 19 is connected to a multiplier 20 of storage and processing device 10, the output 21 of which feeds the actual damping force $F_{dact}$ to the controller 12.

The piston speed $\dot{x}_{ar}$ is also supplied to a sign comparator 22, which receives a reference potential B as further input variable. The comparator 22 tests whether the piston speed $\dot{x}_{ar}$ is positive or negative with respect to the reference potential B. The output 23 of the sign comparator is connected to a controllable inverter 24, to which the vehicle body speed $\dot{x}_a$ is supplied as input variable. If the piston speed $\dot{x}_{ar}$ assumes a positive value with respect to the reference potential B, the output 23 actuates the inverter 24 in such a way that the latter has the vehicle body speed $\dot{x}_a$ in unchanged form—that is to say not inverted—at its output 25. The inverter 24 inverts the vehicle body speed $\dot{x}_a$ if the piston speed $\dot{x}_{ar}$ assumes a negative value with respect to the reference potential B.

The output 25 of the inverter 24 is connected to a half-wave rectifier 26, which allows through the positive values of the vehicle body speed $\dot{x}_a$. These are supplied to a summing point 27, which receives as further input variable the value of the piston speed $\dot{x}_{ar}$. The output 28, at which the reference damping force $F_{d\,ref}$ is available, is connected to the controller 12. The control voltage for the through-flow cross-section q of the damper 1 is available at the output 13 of the controller, said control voltage being fed via an offset/limiter circuit 29 to the multiplier 20 as input variable 30.

Since the damper 1 is simulated by storage and processing device 10 in the exemplary embodiments of FIGS. 2 and 3, control only takes place within the electronic system, so that no mechanical delays occur. As a result, the adjustment can occur very rapidly and without problems with hunting.

With the relatively simple design according to the invention, the Karnopp control principle can be implemented in a suspension control. This control concept can be combined in a simple manner with further controls (e.g. carriage-dependent switching).

In particular, the electronic system upon which the solution according to the invention is based can be used directly "in situ", that is to say at or in the damper 1. This applies equally to the necessary sensing system. To this extent, it is possible to realise a simple (also retrofittable) semiactive suspension control concept without separate sensors or control units having to be used. Preferably, each wheel of the vehicle is controlled individually, by means of which a clear improvement in comfort and driving safety can be obtained.

What is claimed is:

1. A method for at least one of control and regulation of a suspension system on a vehicle, said suspension system including at least one adjustable damper having a piston and an adjustable flow cross section, said method comprising the steps of:

calculating a reference damping force for said damper, said reference damping force dependent on at least one variable of state, said variable of state including an actual value of a velocity of a said piston;

transmitting said actual value of said piston velocity to a storage and processing device (8, 10) including mapped data representing characteristic curves of an actual damping force (Fdact), said storage and processing device simulating said actual damping force (Fdact) in said damper utilizing said mapped data;

generating a control signal with a controller, said control signal dependent on said reference damping force (Fdref) and said actual damping force (Fdact); and transmitting said control signal to said damper for adjusting of said adjustable flow cross section, and to said storage and processing device (8, 10) as an input thereto.

2. The method of claim 1, comprising the further step of transmitting said reference damping value (Fdref) to said storage and processing device (8, 10) as an input thereto.

3. The method of claim 1, comprising the further step of calculating a vehicle body velocity, said vehicle body velocity comprising one said variable of state; said reference damping force calculated dependent on said vehicle body velocity and said actual value of said piston velocity.

4. The method of claim 1, wherein said step of calculating said reference damping force (Fdref) comprises the step of utilizing a Karnopp control concept.

5. The method of claim 1, wherein said step of calculating said reference damping force (Fdref) comprises the step of utilizing digital or analog computing circuitry.

6. The method of claim 1, wherein said control signal comprises a control voltage, and said step of transmitting said control signal comprises transmitting said control signal to said damper via a voltage/through-flow cross-section converter (9).

7. The method of claim 6, wherein said storage and processing unit (8, 10) comprises one of digital and analog circuitry.

8. The method of claim 7, comprising the further steps of:

sensing a piston travel;
   providing a signal representing said sensed piston travel;
   differentiating said signal representing said sensed piston travel;
   rectifying said differentiated signal with a full-wave rectifier;
   squaring said rectified signal; and
   multiplying said squared signal with said control voltage.

9. The method of claim 8, comprising the further steps of:

sensing a vehicle body velocity;
   providing a signal representing said vehicle body velocity;
   inverting said signal representing said vehicle body velocity dependent on a mathematical sign of said actual value of said piston velocity;
   rectifying said inverted signal with a half wave rectifier;
   summing said rectified and inverted signal with said rectified and differentiated signal, said summed signals representing said reference damping force.

10. The method of claim 1, wherein said vehicle includes a plurality of wheels, said at least one damper comprising a plurality of dampers, each said damper respectively associated with each said wheel, each said damper including a suspension control circuit.

11. The method of claim 1, wherein said at least one variable of state comprises at least one of piston travel, piston velocity, piston acceleration, and vehicle body velocity.

12. A method for at least one of control and regulation of a chassis on a vehicle, said chassis including at least one adjustable damper having a piston and an adjustable flow cross section, said method comprising the steps of determining a reference damping force for said piston dependent on at least one variable of state, said variable of state including an actual value of a velocity of said piston; and adjusting said adjustable flow cross section dependent on said actual value of said piston velocity and a said reference damping force; wherein the improvement comprises the steps of:

generating a control signal dependent on an actual damping force and said reference damping force;
   generating a signal representing said actual damping force in a storage and processing device (10) dependent on said actual value of said piston velocity and said control signal; and
   adjusting said adjustable flow cross section dependent on said control signal.

13. A device for at least one of control and regulation of a chassis on a vehicle, comprising at least one adjustable damper having a piston and an adjustable flow cross section, means for determining a reference damping force for said piston dependent on at least one variable of state, said variable of state including an actual value of a velocity of said piston; and means for adjusting said adjustable flow cross section dependent on said actual value of said piston velocity and a said reference damping force; wherein the improvement comprises:

means for generating a control signal dependent on an actual damping force and said reference damping force; and
   a storage and processing device (10) for generating a signal representing said actual damping force dependent on said actual value of said piston velocity and said control signal;
   said adjusting means adjusting said adjustable flow cross section dependent on said control signal.

* * * * *